Feb. 2, 1932.  H. F. HERBIG  1,843,226
METHOD OF CORRECTING ARTIFICIAL LINES IN DUPLEX SYSTEMS
Filed April 1, 1931  2 Sheets-Sheet 1
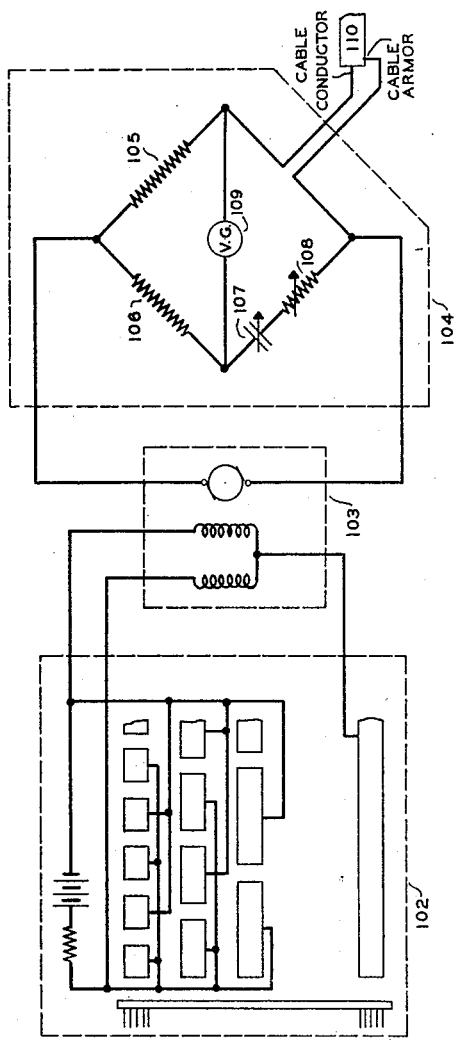
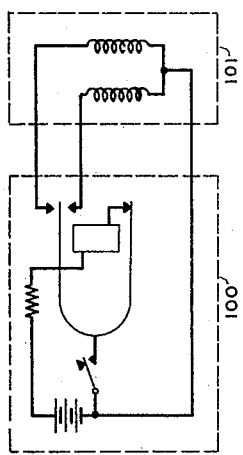
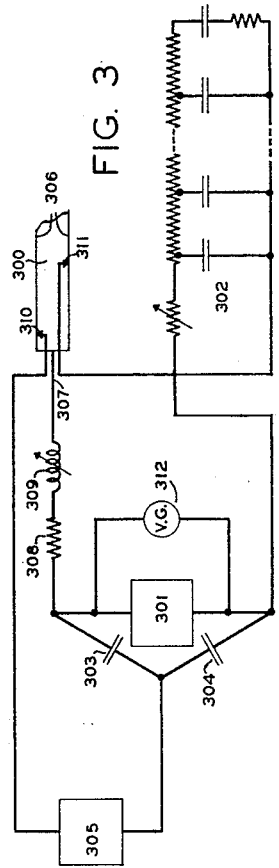
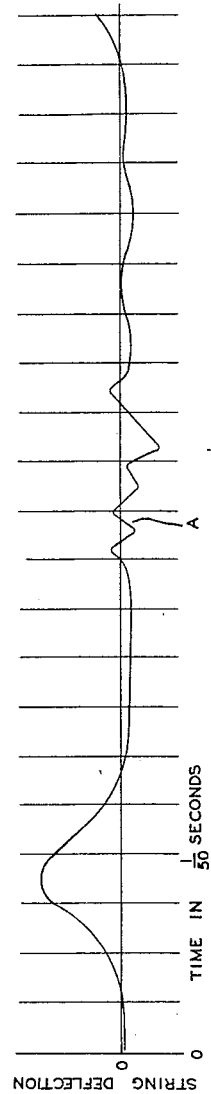
INVENTOR
HENRY F. HERBIG
BY R. C. Hopgood
ATTORNEY

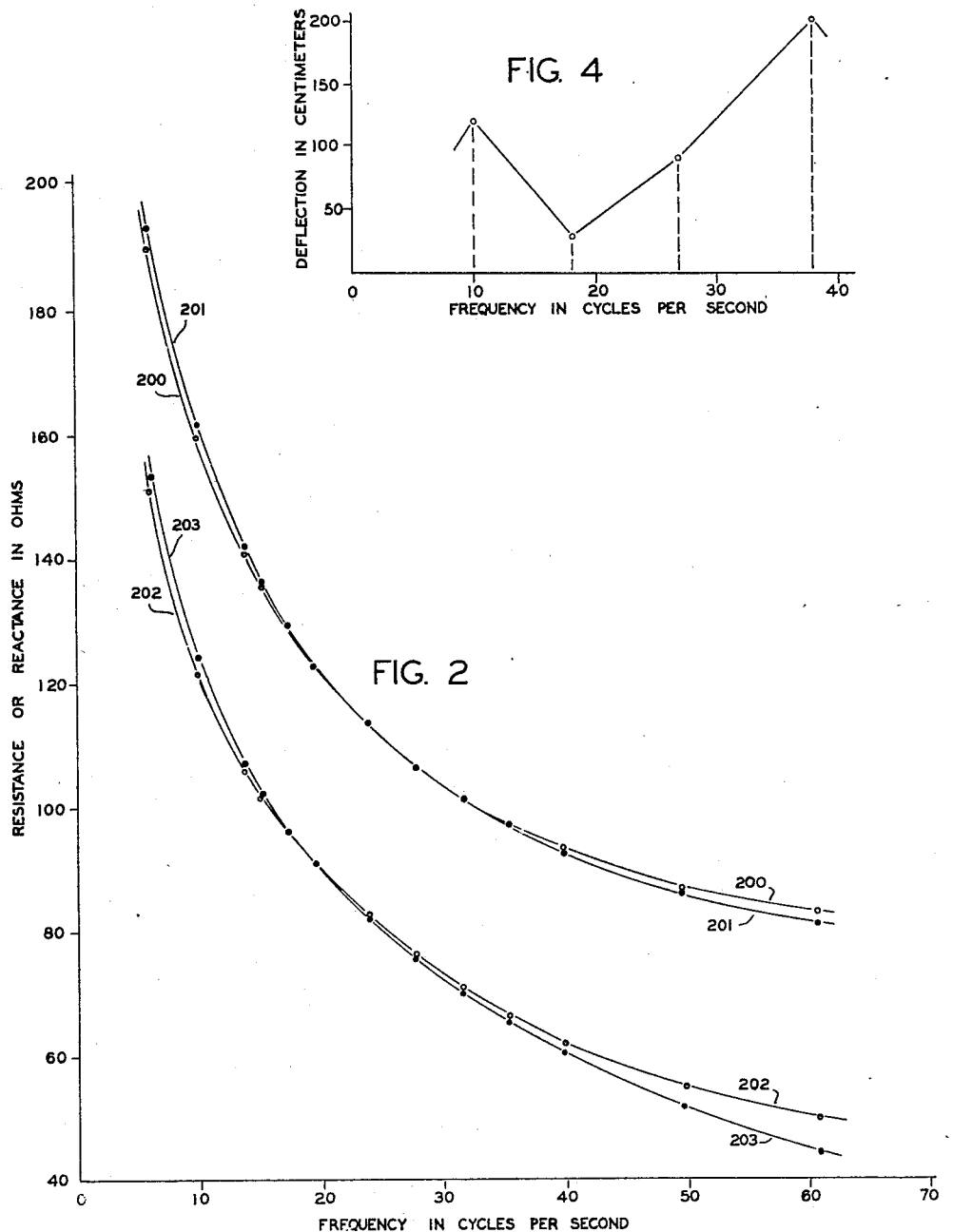

Patented Feb. 2, 1932

1,843,226

UNITED STATES PATENT OFFICE

HENRY F. HERBIG, OF SHORT HILLS, NEW JERSEY, ASSIGNOR TO INTERNATIONAL COMMUNICATIONS LABORATORIES, INC., OF NEW YORK, N. Y., A CORPORATION OF NEW YORK

METHOD OF CORRECTING ARTIFICIAL LINES IN DUPLEX SYSTEMS

Application filed April 1, 1931. Serial No. 526,898.

This invention relates generally to improvements in electrical communication and more particularly to a general method of "correction" for the artificial line in a duplex system.

In various systems of electrical communication as in telephony, land-line and submarine cable telegraphy, it is customary to "duplex" the wave conductor, that is, to arrange it with an artificial line in such a way that transmission over the wave conductor can take place simultaneously in both directions without interference between signals originating at the opposite ends of the cable. The essential condition of a duplex system is that the artificial line shall have the same impedance as the wave conductor.

The invention disclosed herein is described with particular reference to its application in submarine cable telegraphy in which field the greatest difficulty is encountered in duplexing a wave conductor. It should be noted, however, that the principles involved are equally applicable to land-line telegraphy and to telephony.

In order to duplex a submarine cable the artificial line should have the same impedance as the cable for a band of frequencies usually two to three times that of the signal frequency. If this equality of impedance does not exist, the signalling speed at which the cable can be operated will be less than the signalling capacity of the cable. In actual practice reductions in the operating speed of the cable, traceable to this cause, are of frequent occurrence. When serious reductions in operating speed occur, it is necessary to minimize or eliminate the differences existing at equivalent electrical positions between the impedance of the cable and artificial line, or as these differences are otherwise called "impedance mismatches", by making adjustments at various positions in the artificial line. The process of making such adjustments is generally termed "correction".

In the past "correction" has been effected by trial and error methods. These methods usually consisted of making tentative adjustments at various positions on the artificial line until something approximating the proper correction was made. Such methods of correction required considerable time as well as some special knowledge of the particular duplex structure to be corrected, while they were not exact enough to permit the operation of the cable at its maximum signalling speed.

One of the principal objects of the present invention is to provide a general method of correction by which the location of positions on the artificial line at which adjustment is required and the amount and nature of such adjustments can readily be determined.

This invention will be understood from the following description and accompanying drawings in which:

Figures 1 and 3 illustrate diagrammatically the apparatus used in obtaining certain required measurements for carrying out this invention; Figures 2 and 4 illustrate curves used in explanation of the invention, and Figure 5 illustrates an Einthoven oscillogram of the type obtained in carrying out the invention.

The steps taken in carrying out this invention will be summarized for the sake of clearness.

1. Terminal impedance measurements of the cable and artificial line are made for each frequency of the selected band of frequencies and from these measurements the total effect of the impedance mismatches existing at each of the measured frequencies in terms of their resistance and reactance components, is computed.

2. For each of the frequencies at which impedance mismatch is found by (1) adjustment is made at a position in the artificial line coincident with the quarter wave length of that frequency; the amount of the adjustments for each frequency being determined from the impedance measurements outlined in (1).

A more accurate method of locating the positions of adjustment on the artificial line than the method outlined in (2), is the following:

3. The waves caused by impedance mismatches existing in the duplex structure are measured in terms of the frequency of their occurrence and their relative energy, for the purpose of determining the relative effect on the duplex structure of the said impedance mismatches.

4. The waves caused by impedance mismatches existing in the duplex structure are measured in terms of the frequency of their occurrence and the time required for them to return to the point of measurement.

5. Correction for the impedance mismatches whose positions are found from (4) are then made at coincident positions on the artificial line; but correction at said positions is made in an order determined by the magnitude of the effect on the duplex structure of the impedance mismatches respectively coincident with said positions as determined by (3); while the amount of adjustment is determined by (1).

Referring now to Figure 1, the apparatus employed in measuring the terminal impedance of the cable and artificial line respectively is shown schematically. This apparatus comprises a source of alternating current impulses, together with means for regulating the frequency of such impulses, a decade bridge and the unknown impedance which may be either the cable or the artificial line (not shown).

The source of alternating current impulses includes a tuning fork 100, a phonic motor 101; and a distributor 102 cooperating in a manner well known in the art to supply impulses to a pulse generator 103. As this apparatus is more fully disclosed in a prior application Ser. No. 516,938, filed February 19, 1931, made by H. F. Herbig, it is considered unnecessary to describe it in more detail here. It is obvious that other systems of generating alternating impulses might be used as, for example, an automatic transmitter with reversals, as signal tape, or, any other type of frequency machine. The frequency of the impulses generated by the alternator can be readily changed by adjusting the brushes of the distributor 102, so that a particular one of the concentric rings and the face plate is used or by varying the speed of phonic motor 101. As these methods are well-known in the art, they are not described in detail here. The decade bridge 104 which is connected with the pulse generator 103 includes a first and a second arm having respectively the equal resistances 105 and 106; a third arm to which the unknown impedance is connected and a fourth arm which includes a variable resistance 107 in series with a variable capacity 108. It is desirable, though not necessary, to make the resistance 105 and 106 equal in order that the adjustments required to produce a balance can be determined without calculation. A vibration galvanometer 109 is used to detect unbalance between the third and fourth arms of the bridge. For very low frequencies, that is, between 3 to 10 c. p. s. the vibration galvanometer is replaced by a recorder coil system (not shown) which may be used as a vibration galvanometer for such low frequencies. This system consists of an ordinary recorder coil system tuned to low frequencies by means of a screw adjustment adapted to vary the tension of the recorder coil. As the use of such a system for this purpose is well-known in the art, it is considered unnecessary to describe it in more detail here.

After the alternator 100 is adjusted to supply alternating current impulses of a selected frequency, the vibration galvanometer 109 is tuned to that frequency. The decade bridge 104 is then balanced by alternatively varying the capacity 108 and the resistance 107 until the vibration galvanometer 109 indicates that equality exists between the impedance of the cable 110 and the impedance of the fourth arm of the bridge. As the first and second arms of the bridge have equal resistance, the resistance and capacity required to balance, at this frequency, the resistance and reactance components respectively of the vector impedance of the cable are determined. In the same manner the resistance and capacity required to balance reactance components respectively of the artificial line vector impedance at the same frequency are determined.

Then the alternator 100 and the vibration galvanometer 109 are adjusted to each of the remaining frequencies of the selected band and the procedure above described is repeated at each frequency. In this way the resistance and capacity required to balance the resistance and reactance components respectively of the cable and artificial line vector impedance can be determined for each frequency of the selected band.

From the foregoing terminal impedance measurements the difference at any frequency between the values of the resistance required to balance the resistance component of the artificial line and of the cable respectively and between the values of the capacity required to balance the reactance component of the cable end of the artificial line respectively can be found. As the differences thus found are the values of resistance and capacity required to equalize the impedance of the cable and artificial line for identical frequencies, from their respective values, the amount of adjustment required in the artificial line at positions determined in part from these frequencies by a method described later may be approximately ascertained. Consequently the amount and nature of the correction at each of the positions in the artificial line, where correction is required, may be determined, though the location of such positions remains to be found.

Before describing the method of finding the above mentioned positions on the artificial line, reference is made to Figure 2 which is useful in studying the variation with frequency of the impedance mismatch existing in the duplex structure. Curves 200 and 201 represent respectively the variation with frequency of the resistance component of the cable and the resistance component of the artificial line. Curves 202 and 203 represent respectively the variation with frequency of the reactance component of the cable and the reactance of the artificial line. The difference at any frequency between the resistance component of the cable and that of the artificial line can be obtained directly by finding the difference between the values of the resistances required at that frequency to balance respectively the resistance component of the cable impedance and of the artificial line impedance. From the capacity required to balance the reactance of vector impedance at any frequency the latter component can be found by means of the formula $$X_a = \frac{1}{2\pi f C}$$

where $X_a$ is the reactance component of impedance, $f$ is the frequency in c. p. s. and C is the capacity in farads.

Having determined the amounts of correction necessary, the next step is to locate the positions in the artificial line at which correction should be made. It has previously been mentioned that there are two possible methods for determining the location of such positions.

The first of these methods, which is approximate only, is to apply correction at the positions of the artificial line coincident with a quarter wave length of the frequency at which an impedance mismatch occurs. According to this method the position of correction on the artificial line can be located by calculating the quarter wave length corresponding to a frequency at which an impedance mismatch occurs, expressing this wave length in terms of capacity, and finding the position on the artificial line, which is calibrated in units of capacity, having a capacity equal to that of the quarter wave length.

This may be done with the help of the following mathematical formula:

$$N = \frac{2\pi}{B}$$

N = Wave length in nautical miles
B = Wave length constant $$B = \sqrt{\frac{1}{2}\sqrt{(R^2+W^2L^2)(G^2+W^2C^2)} - (RG - W^2LC)}$$

Where:
W = $2\pi f$
$f$ = frequency in cycles per second
R = Resistance per nautical mile in ohms
L = Inductance per nautical mile in henries
C = Capacity per nautical mile in farads
G = Leakance per nautical mile in mhos When G is nearly zero:

$$B = \sqrt{\frac{WC}{2}(\sqrt{R^2W^2L^2} + WL)}$$

$$N = \frac{2\sqrt{\pi}}{C\sqrt{f\sqrt{k^2\frac{W^2L^2}{C^2} + \frac{WL}{C}}}}$$

Where:

K = the core ratio $\frac{R}{C}$

Let $CN = C_1$ = total capacity for a wave length corresponding to a selected frequency $$C_1 = \frac{2\sqrt{\pi}}{\sqrt{f\left(\sqrt{\frac{K^2+W^2L^2}{C^2}} + \frac{WL}{C}\right)}}$$

$$C_1 = \frac{\sqrt{2}}{\sqrt{\frac{f^2L}{C}\left[\sqrt{\frac{R^2}{W^2L^2}+1}+1\right]}}$$

When the capacities are in micro-farads, this last equation becomes:

$$C_1 = \frac{10^3 \sqrt{2}}{\sqrt{\frac{f^2L}{C}\left[\sqrt{\frac{R^2}{W^2L^2}+1}+1\right]}}$$

When the signalling frequency is low such that the inductance plays a negligible part, L may be assumed equal to zero in which case the last equation becomes:

$$C = \frac{2\sqrt{\pi} \times 10^3}{fK}$$

From the value of C, as found by means of the foregoing equations, the position of correction corresponding to the selected frequency can be located.

The amount of capacity and resistance correction corresponding to frequency and determined by the previously described method are then applied at this position on the artificial line, and the cable and the artificial line are then in a better condition of balance for the particular frequency.

In a like manner the positions of correction on the artificial line, corresponding to each of the remaining frequencies at which impedance mismatches were found to exist, can be readily determined, and the proper amounts of resistance and capacity correction made.

After these corrections are applied there effects should be examined by again measuring the impedance values of the cable and the artificial line. If it appears from these measurements that the cable and the artificial line are not in balance, minor adjustments can be made according to the method above set forth until the two are accurately balanced.

As it is frequently convenient to know the frequency having its quarter wave length at points of correction along the artificial line, the following formulæ are given:

$$f = \frac{4\pi C}{C_1\sqrt{C_1^2 R^2 + 16\pi^2 CL}}$$

When the capacities are in micro-farads, the last equation becomes:

$$f = \frac{4\pi 10^3 C}{C_1\sqrt{C_1^2 \times 10^{-6} R^2 + 16\pi^2 CL}}$$

As $f$ represents the frequency for a full wave length for $C_1$ micro-farads, and if an adjustment is made at any point along the artificial line, then the frequency having its ¼ wave length at $C_1$ micro-farads is:

$$f = \frac{\pi 10^3 C}{4C_1\sqrt{(C_1)^2 10^{-6} R^2 + \pi^2 CL}}$$

When the signalling frequency is low such that the effect of the self inductance can be neglected, L may be assumed equal to zero. The frequency will then be:

$$f = \frac{10^6 \pi}{4 C_1 2_K}$$

where the capacities are in micro-farads.

A small variable resistance in series with the artificial line is used to balance resistance changes in the cable resulting from temperature changes in the littoral sea water, and a small subdivided capacity in shunt with the artificial line is used to counteract capacity unbalance resulting from the same cause.

Then, in a manner well known in the art, the following changes are made:

The artificial line-sea-earth is balanced by inserting a variable inductance and resistance in series with, and at the head of, the cable.

The block condensers of the cable and the artificial line are then balanced, in the way above described, for the fundamental frequencies of signalling. This is done by using a bridge having equal ratio arms of non-inductive resistance and by using the vibration galvanometer to detect unbalance. If the condensers in the bridge arms have different leakance, a small resistance in series with the condenser of higher insulation resistance is varied to produce a balance. The capacities of the condensers are equalized by connecting a vernier condenser in parallel with the condenser having the least capacity, and adjusting it until balance is obtained. After the condensers have been balanced for leakance and capacity, they are reconnected to the duplexed cable.

When the elements of the duplexed cable which are likely to produce unbalance have been unbalanced individually and in the aggregate, according to the above described method, a balance between the cable and the artificial line will have been obtained which will permit a higher speed of operation than has hitherto been practicable.

Referring now to Figure 3, the alternative and more accurate method of locating positions of correction on the artificial line will be described. A submarine cable 300 is shown terminating in the usual duplex bridge arrangement with the receiver 301, the artificial line 302 and the blocking condensers 303 and 304 in the equal arms of the duplex bridge. In series with and at the head of the cable conductor 307, is a resistance 308 in series with a variable inductance 309 which forms an artificial line-sea earth compensation. Instead of the usual transmitter, the alternator 305, as previously described, is connected to the transmitter-sea earth 310 and the apex of the duplex bridge. The sea earth conductor 311 is connected to the cable armor 306. In shunt around the receiver 301 is a vibration galvanometer 312 which acts as a detector of unbalance as before. The operation of this apparatus in obtaining measurements of the relative differential reflections at various frequencies will now be described. The alternator 305 is adjusted to a particular frequency as is also the vibration galvanometer 312. The alternator 305 is then started and the deflection of the galvanometer recorded. The same procedure is repeated for frequencies varying between a few cycles to 60 cycles or more per second. Taking these values and plotting frequency as abscissæ and the corrected deflection of the galvanometer as ordinates, the curve such as in Figure 4 is obtained. Several peaks will occur in the resulting curve at various frequencies throughout the frequency range. As the magnitude of deflection is proportional to the amount of impedance mismatch this curve will give an indication of the relative impedance mismatches existing at the various frequencies.

To determine the positions on the artificial line at which occur the reflections whose measurement has just been described, an Einthoven oscillogram is taken of the reflected energy resulting from a single impulse wave reflected by impedance mismatches existing in the duplex structure. Such an oscillogram is illustrated in Figure 5. In making this oscillogram the apparatus is arranged as in Figure 3 except that the vibration galvanometer 312 is replaced by a well-known Einthoven galvanometer and the alternator 305 is adjusted in a well-known manner so that it propagates a single impulse wave into the duplex structure. The string circuit of the Einthoven galvanometer is connected in place of the vibration galvanometer.

As a single impulse wave is composed of a number of waves of varying frequency, it is possible to obtain a record of reflected waves occurring at points in the artificial line at which impedance mismatches exist, which mismatches it is desired to correct.

Suitable time lines are recorded on the film simultaneously with the photographed phenomena. The time required for a single wave to be propagated from the head of the cable to positions of reflection, or, in other words, to positions of impedance mismatch, can therefore be readily determined. Referring now to Figure 5, which is an oscillograph showing the effects of various impedance mismatches existing in a duplex structure, it will be observed that the wave marked A required 11/50 seconds to be propagated to and from an impedance mismatch. One half this time represents the actual travel time of the wave to the position of impedance mismatch. An examination of the oscillograph indicates that one period occurs in approximately 1/50 of a second, and the frequency of the wave is therefore approximately fifty cycles per second. It is of course obvious that the exact frequency of the wave can be determined by measurement of the oscillograph. But assuming the wave to have a frequency of 50 c. p. s., and its propagation time being known the position of the impedance mismatches may be accurately determined. Thus the positions of impedance mismatches can be computed in terms of capacity and once this is done the corresponding positions on the artificial line can readily be determined in a manner previously described.

It has been discovered that the best results are obtained if correction is applied initially at the position on the artificial line corresponding to the greatest impedance mismatch and if succeeding corrections are applied at the remaining positions in an order determined by the decreasing magnitude of their corresponding impedance mismatches. After determining the positions on the artificial line at which correction is necessary, reference should be made to Figure 4 and the values on which the curve of this figure is based, to determine the order in which correction should be applied at the ascertained positions on the artificial line. Correction should be made first at the position corresponding to the impedance mismatch of the greatest magnitude and correction should be made at the other positions in the order determined by the relative magnitude of the impedance mismatches corresponding thereto.

When the required corrections have been applied to the artificial line the procedure previously described should be followed by balancing individually the separate elements of the duplex structure and checking the balance of the entire structure when reassembled to insure the existing cause of disturbance has been eliminated.

Another important application of the method just described is the location of positions of asymmetry caused by the repair of a submarine cable. In such cases a new piece of cable is joined to the old cable and this new cable may have different electrical constants. To locate the positions of asymmetry and to duplicate them by similar asymmetries in the artificial line can be readily accomplished. An Einthoven oscillogram of the reflected energy of a single sine wave is taken and the effects of the reflections caused by the mismatch of impedance at the beginning and end of the inserted section of the cable are recorded. After locating the positions of impedance mismatch by this method, corrections may be made and another record taken. This may be repeated until the mismatch of impedance has been minimized or eliminated.

It may also be mentioned that in the case of an initial installation of a new artificial line when the cable is not available for measurement because of traffic demands or for any other reason, the duplication of the reflection characteristics of the cable may be effected provided that an Einthoven oscillogram of the cable has been previously obtained.

The advantages of my method of correcting an artificial line will be appreciated from the foregoing description. The general method provided, applicable to any duplex system is a distinct improvement over existing trial and error methods. The application of the Einthoven oscillograph in locating positions of impedance mismatch with accuracy and rapidity, and the added convenience of a method by which much of the work of correction can be done without interruption of the traffic over the cable, are obvious improvements over the prior art. The principal advantage of the present method, however, is the accuracy of the balance produced when it is employed.

What is claimed is:

1. The method of balancing a wave conductor and an artificial line, which comprises measuring the terminal impedance of the wave conductor and artificial line, respectively, for each of a plurality of frequencies for the purpose of determining the amount of correction required at each of said frequencies; and applying the amount of correction for a particular frequency so ascertained to a position on the artificial line determined by that frequency.

2. The method of balancing a wave conductor and an artificial line, which comprises measuring the terminal impedance of the wave conductor and artificial line, respectively, for each of a plurality of frequencies for the purpose of determining the amount of correction required at each of said frequencies; and applying the amount of correction for a particular frequency so ascertained to a position on the artificial line coincident with the quarter wave length of the said frequency.

3. The method of balancing a wave conductor and an artificial line for a particular frequency at which unbalance exists, which comprises applying the correction to the artificial line at a position coincident with the quarter wave length of the said frequency.

4. The method of determining the positions in an artificial line at which to apply the corrections required to balance said line with a wave conductor, which comprises propagating a wave over said wave conductor and said line, measuring both the frequency of the waves caused by impedance mis-matches existing in the duplex structure and the time required for said waves to return to the point of measurement; and applying correction at positions on the artificial line coincident with the positions of the existing impedance mis-matches as determined from the said measurements.

5. The method of balancing a wave conductor and an artificial line, which comprises measuring the waves, caused by impedance mis-matches existing in the duplex structure, in terms of the frequency of their occurrence and of the time required for said waves to return to the point of measurement for the purpose of determining the position of the said impedance mis-matches, measuring said waves in terms of the frequency of their occurrence and of their relative energy for the purpose of determining the relative effect on the duplex structure of the said impedance mis-matches, applying correction in the artificial line at positions coincident respectively with the positions of the impedance mis-matches as found by the first mentioned measurements, but applying correction at said positions in the order of the relative effect on the duplex structure of the impedance mis-matches respectively coincident therewith, as found by the second mentioned measurements.

In witness whereof, I hereunto subscribe my name this 31st day of March, 1931.

HENRY F. HERBIG.